United States Patent
Lee

(10) Patent No.: US 9,728,212 B1
(45) Date of Patent: Aug. 8, 2017

(54) DISK DRIVE WITH MULTIPLE READ-WRITE HEADS

(71) Applicant: EMC Corporation, Hopkinton, MA (US)

(72) Inventor: Leo Lee, Morgan Hill, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/191,324

(22) Filed: Jun. 23, 2016

(51) Int. Cl.
*G11B 5/49* (2006.01)
*G11B 5/09* (2006.01)
*G11B 5/29* (2006.01)

(52) U.S. Cl.
CPC ............... *G11B 5/49* (2013.01); *G11B 5/09* (2013.01); *G11B 5/29* (2013.01); *G11B 5/4969* (2013.01)

(58) Field of Classification Search
CPC .......... G11B 5/29; G11B 5/49; G11B 5/4969–5/4992; G11B 21/003–21/006
USPC ................... 360/55, 61–63, 69, 75
See application file for complete search history.

(56) References Cited

U.S. PATENT DOCUMENTS

| | | | | |
|---|---|---|---|---|
| 3,662,361 A * | 5/1972 | Mee | ............ | G11B 5/4976 360/123.01 |
| 5,606,474 A * | 2/1997 | Ketchersid, III | ........ | G11B 5/49 360/63 |
| 5,652,685 A * | 7/1997 | Ketchersid, III | ........ | G11B 5/49 360/125.01 |
| 5,761,166 A * | 6/1998 | Sedlmayr | ............ | G11B 5/4969 360/69 |
| 5,995,461 A * | 11/1999 | Sedlmayr | ............ | G11B 5/4969 360/75 |
| 6,078,468 A * | 6/2000 | Fiske | ................... | G11B 5/4886 360/255.2 |
| 6,078,471 A * | 6/2000 | Fiske | ................... | G11B 5/4886 360/234.4 |
| 6,081,402 A * | 6/2000 | Cho | ....................... | G11B 5/012 360/75 |
| 6,195,231 B1 * | 2/2001 | Sedlmayr | ............ | G11B 5/4969 360/123.17 |
| 6,249,824 B1 * | 6/2001 | Henrichs | ................. | G11B 5/49 360/99.22 |
| 7,289,285 B2 * | 10/2007 | Barnes | .................... | G11B 5/49 360/245.9 |

(Continued)

*Primary Examiner* — Wayne Young
*Assistant Examiner* — James L Habermehl
(74) *Attorney, Agent, or Firm* — Blakely, Sokoloff, Taylor & Zafman LLP

(57) ABSTRACT

The embodiments of the invention improve the traditional disk drives by eliminating the mechanical actuator assembly that moves the read-write head attached to the actuator assembly, and replacing it with multiple read-write heads mounted over one or more rotating platters. The number of the read-write heads is preferably sufficiently large so that the read-write heads cover all tracks on the one or more rotating platters. In one embodiment, a disk includes a rotatable platter, a central spindle to rotate the rotatable platter arounds an axis, an electric motor to drive the central spindle, and multiple read-write heads mounted over the rotatable platter. In one embodiment, the platter includes multiple tracks arranged in form of concentric circles, where each of the read-write heads performs read-write operations on one of the tracks, and each track is assigned at least one of the multiple read-write heads.

20 Claims, 5 Drawing Sheets

(56) References Cited

U.S. PATENT DOCUMENTS

| | | | | |
|---|---|---|---|---|
| 8,279,545 B2* | 10/2012 | Hillis | ............... | G11B 5/49 |
| | | | | 360/61 |
| 8,693,126 B2* | 4/2014 | Buckholdt | ............... | G11B 5/49 |
| | | | | 360/63 |
| 2006/0119973 A1* | 6/2006 | Jamail | ............... | G11B 5/4976 |
| | | | | 360/63 |
| 2007/0230003 A1* | 10/2007 | Barnes | ............... | G11B 5/49 |
| | | | | 360/31 |
| 2007/0253112 A1* | 11/2007 | Hall | ............... | G11B 5/49 |
| | | | | 360/244 |
| 2010/0208384 A1* | 8/2010 | Tran | ............... | G11B 5/5521 |
| | | | | 360/75 |

* cited by examiner

DISK DRIVE WITH MULTIPLE READ-WRITE HEADS

FIELD OF THE INVENTION

Embodiments of the present invention relate generally to disk drives. More particularly, embodiments of the invention relate to disk drives with multiple read-write heads.

BACKGROUND

Computer hard drives remain a low speed component for data storage in computer systems. While the computational power of processing units (i.e., CPUs) and the capacity of memory and external storage of computer systems have been increased consistent with Moore's law for many years, access latency and data transmission rate of hard drives have not kept up with this pace. This is largely due to the mechanical nature of the rotating disks and moving heads. For example, to perform a read operation, traditional hard drives utilize an electrically or magnetically driven mechanical actuator assembly to first move a read-write head attached to the actuator assembly to a desired track on the hard disk, which is a concentric circular strip. Next, the read-write head waits for a desired sector of the track to rotate and arrive under the head. The data stored on the platter then can be read by the read-write head and transmitted by the disk drive. As a result, it takes a long time to access the data.

Recently emerged solid state drives (SSD) do not have moving parts, making it faster than traditional hard drives. However, SSDs use electrically programmable non-volatile flash memory other than magnetic mediums to store data, and thus are significantly more expensive than hard drives. For example, currently a typical 4 TB hard disk drive is priced between $100 and $125, while a 500 GB SSD costs more than that. Moreover, the capacity ratio between HDDs and SSDs can be as high as 800:1.

FIG. 1 is an illustrative diagram showing a conventional disk drive of the prior art. Hard disk 100 includes one or more rotatable disk platters 102 (showing only one in FIG. 1), an actuator assembly 104, a read-write header 106 attached to the actuator assembly 104, multiple tracks on the disk platters, including the outermost track 108 and the innermost track 110, and a central spindle 112 driven by an electric motor that rotates the disk platters around the axis of the spindle.

Actuator assembly 104 is a highly precise moving component in disk drives and requires many sophisticated technologies. It must be able to move accurately, quickly and smoothly. To achieve this, actuator assembly 104 includes several components not shown in FIG. 1 for it to work and meet various requirements, such as, an actuator magnet, a voice coil that drives the actuator arm under a magnetic force induced by the actuator magnet when a current flows through the voice coil, a voice coil motor driver or controller that controls the movement of the voice coil driving the actuator arm and can be very power consumptive, to name a few. Clearly, eliminating the needs for an actuator assembly in disk drives would be advantageous.

To perform a read operation by the disk drive in FIG. 1, read-write head 106 first needs to be moved to the particular track where the data to be read is located. Actuator assembly 104 is rotatable around the axis 105 so that read-write head 106 can move to any track on platter 102. Thus, in actual operation, actuator assembly 104 will rotate back and forth around axis 105, so that read-write head 106 can read from and write data to all tracks on platter 102. In worst case, read-write head 106 may have to move from outermost track 108 to innermost track 110 before read-write head 106 can perform read-write operations. The time needed for actuator assembly 104 to drive read-write head 106 to travel to the desired track, called seek time, ranges from about 4 ms to 15 ms.

After read-write head 106 moves to the desired track, the head has to wait for a particular sector of the track to reach read-write head 106 before any read or write operation can begin. This latency depends on how far the particular sector is away from read-write head 106 when read-write head 106 starts to move to the track and depends on the rotational speed of disk platter 102.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
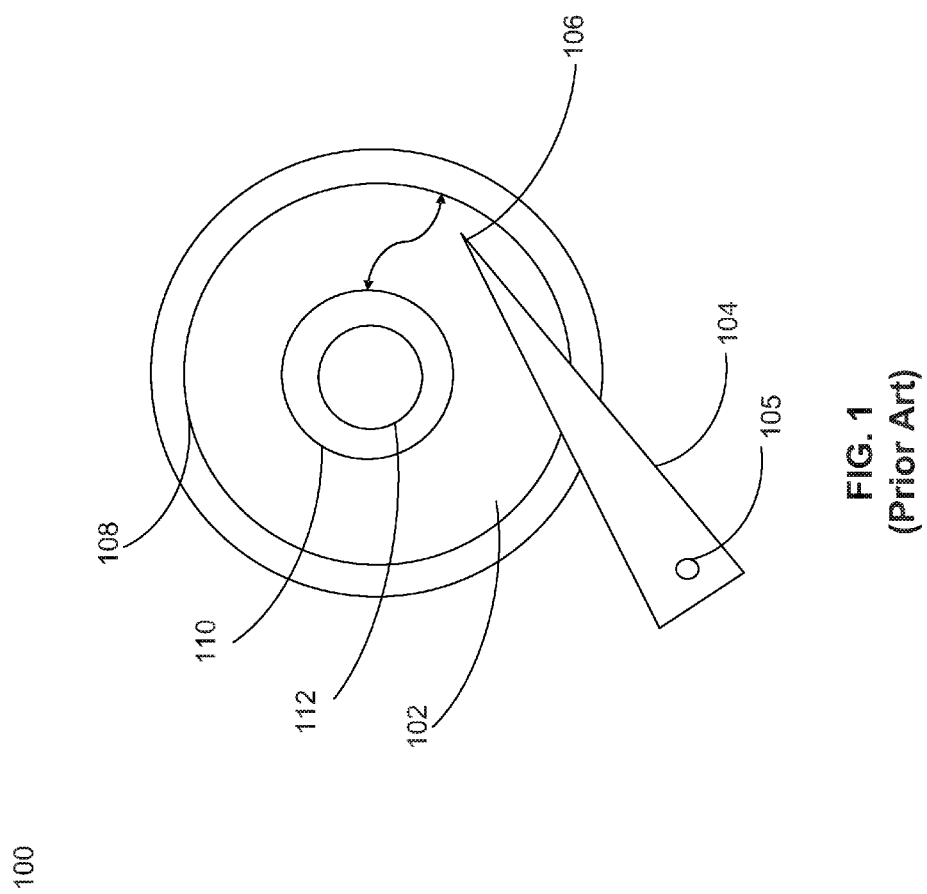
FIG. 1 is an illustrative diagram showing a disk drive of the prior art.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

The embodiments of the invention improve the traditional disk drives by eliminating the mechanical actuator assembly that moves the read-write head attached to the actuator assembly, and replacing it with multiple read-write heads mounted over one or more rotating platters. The number of the read-write heads is preferably sufficiently large so that the read-write heads cover all tracks on the one or more rotating platters. Accordingly, there is no need to move the read-write heads over the platters. By replacing the mechanical actuator assembly with the multiple read-write heads, the average time to move a read-write head and wait for it to reach the desired area will be significantly reduced. Furthermore, the multiple read-write heads allow a disk drive to perform reading and writing operations substantially simultaneously, which can increase the throughput of the disk drive significantly.

In one embodiment, a disk includes a rotatable platter, a central spindle to rotate the rotatable platter arounds an axis, an electric motor to drive the central spindle, and multiple read-write heads mounted over the rotatable platter. The rotatable platter stores data magnetically. The read-write heads can read data stored on the rotatable platter, and can write data to the rotatable platter. In one embodiment, the platter includes multiple tracks arranged in form of concentric circles, where each of the read-write heads performs read-write operations on one of the tracks, and each track is assigned at least one of the multiple read-write heads.

Accordingly, the above arrangement of multiple read-write heads allows those read-write heads to read and write on each and every track without having to move any of the multiple read-write heads, thereby eliminating the need for a mechanical actuator assembly to move a read-write head over the entire platter to perform the read-write operations on the platter.

In one embodiment, some or all tracks are assigned more than one read-write heads dedicated for that track. Preferably, those read-write heads are separated with each other or evenly distributed over the assigned track.

In one embodiment, the multiple read-write heads perform read-write operations substantially simultaneously, thereby increasing the overall throughput of the disk drive significantly. In one embodiment, the disk drive includes multiple external output channels to transmit and receive data.

Figure 2:
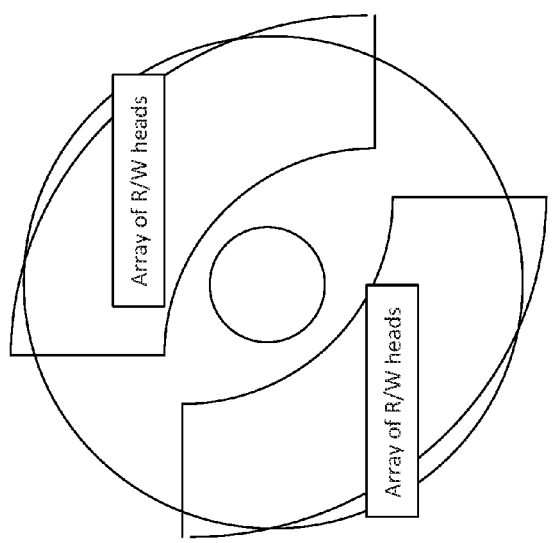
FIG. 2 is an illustrative diagram showing a disk drive according to one embodiment of the invention.

FIG. 2 is an illustrative diagram showing a disk drive according to one embodiment of the invention. Comparing with FIG. 1, disk drive 200 does not include an actuator assembly to move any read-write head. Instead, disk drive 200 is equipped with an array of read-write heads, the number of which is preferably sufficient for those read-write heads to cover multiple or all tracks of the entire disk platter, thereby reducing the needs for any of the read-write heads to move over the platter between different tracks. Thus, whenever disk drive 200 needs to perform a read-write operation, a majority of the delay would be the rotational time of the disk platter rotating from an initial position until the particular sector of a track where the data to be read is located or where a read-write head is to write the data reaches the read-write head, i.e. the latency as described with respect to FIG. 1. For example, for disk drive with 7,200 RPM rotational speed, the average latency is about 4.2 ms. However, the delay can be further reduced for some tracks to which more than one read-write heads are assigned. For example, if two read-write heads are assigned to a track, the average delay can be reduced by half, i.e., to 2.1 ms. If fifty read-write heads are assigned, the average delay would be reduced to 0.084 ms only. Comparing with the seek time and latency of existing disk drives with 7,200 RPM rotational speed, with the total delay ranging from 8.2 ms to 19.2 ms, the performance can be significantly improved.

Moreover, unlike traditional disk drives that have only one read-write head to perform read-write operations on a disk platter at a time, the disk drive shown in FIG. 2 can perform multiple read-write operations at a time. Clearly, this will further increase the data read-write throughput significantly.

The number of disk platters and the arrangements of read-write heads over the disk platters are not limited in any particular way. In one embodiment, a disk drive may have more than one disk platters as do many current disk drives.

In another embodiment, the read-write heads can be grouped within a specific area over the platter or can be distributed over the entire platter. In one embodiment, the read-write heads are classified into read heads and write heads, where read heads perform read operations only and write heads perform write operations only.

Figure 3:
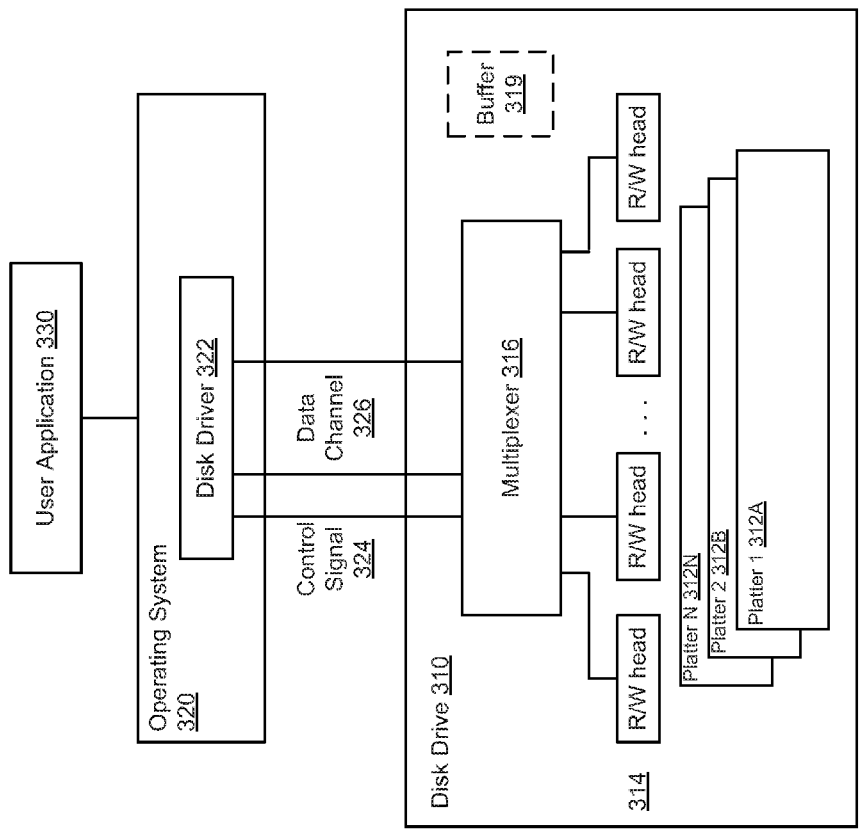
FIG. 3 is block diagram illustrating a data processing system according to one embodiment of the invention.

FIG. 3 is block diagram illustrating a data processing system 300 according to one embodiment of the invention. Data processing system 300 includes disk drive 310, operation system 320, and user application 330. Data processing system 300 may include other components not shown in FIG. 3, such as input/output devices, other storage devices, network devices, processing units, memory, etc., as one skilled in the art would appreciate.

Disk drive 310 includes disk platters 312A, 312B, . . . , 312N, read-write (R/W) heads 314, multiplexer 316, and an optional buffer 319. User application 330 accesses disk drive 310 for data read-write operations via operating system 320, which includes disk driver 322 to support those operations. Disk driver 322 communicates with disk drive 310 via control signal 324 as well as transmitting data with disk drive 310 via data channel 326.

Multiplexer 316 chooses one of the read-write heads 314 to receive data for writing from and/or send data to disk driver 322, when more than one read-write head needs to operate simultaneously. Multiplexer 316 may implement a first-come, first-served queue to choose which read-write head to be the next one to receive data for writing from and/or send data to disk driver 322. However, one skilled in the art would understand that multiplexer 316 can use any other algorithms that are known to them.

The optional buffer 319, also known as disk cache, can be used for various purposes to increase disk performance, including storing unrequested read data in case being requested later, storing data to be written in buffer 319 and signaling the operating system that the disk write is complete without actually writing it to the disk platter, known as write acceleration, etc., as one skilled in the art would understand. In one embodiment, all read-write heads 314 share one buffer 319. In another embodiment, each read-write head 314 is provided with a dedicated, separate buffer.

Figure 4:
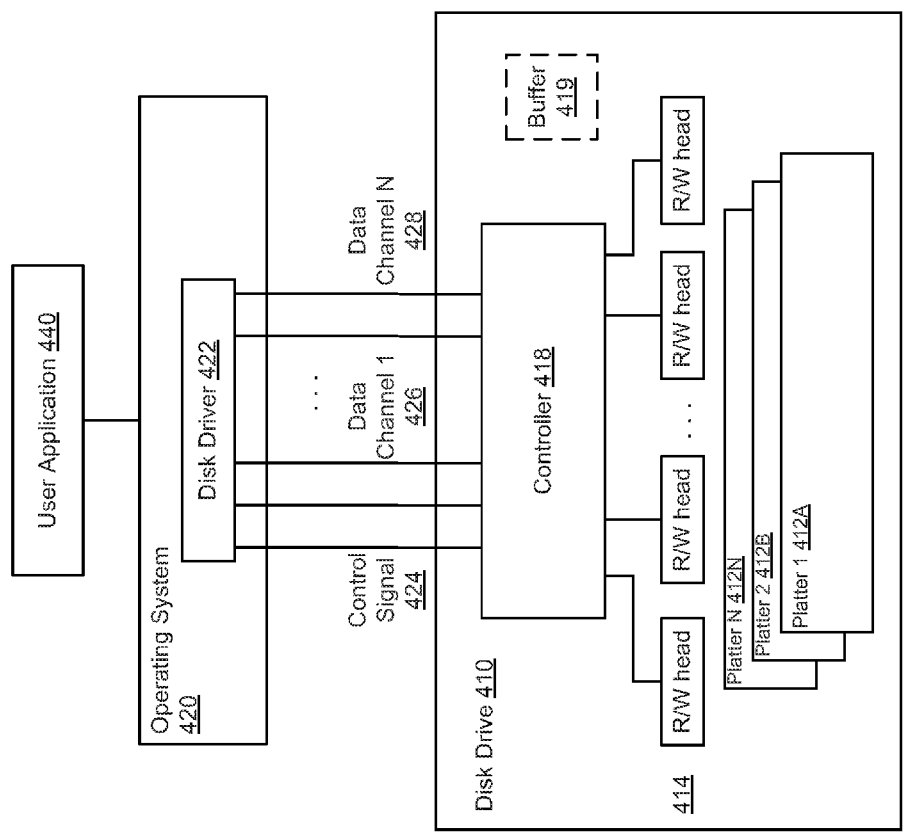
FIG. 4 is a block diagram illustrating a data processing system according to another embodiment of the invention.

FIG. 4 is a block diagram illustrating a data processing system 400 according to another embodiment of the invention. In FIG. 4, more than one data channel is provided for disk drive 410 to send data to and receive data from disk driver 322, and thus data throughput of disk drive will be significantly increased. Therefore, multiple read-write heads 414 can work simultaneously and independently, with each of them performs read and/or write operations on assigned tracks and transmits data to and/or receives data from disk driver 422. In one embodiment, disk drive 410 is equipped with controller 418 to support parallel data reception and transmission between disk drive 410 and disk driver 422, while controller 418 is not meant to be limited to perform such operations. In one embodiment, controller 418 reads data from buffer 419 to output to one of the data channels and/or receives data from one of the data channels and writes the data to buffer 419, which will be written to the disk platter at a later time. Controller 418 may be implemented by adapting various known disk scheduling algorithms and incorporating the new designs of disk drives according to embodiments of the invention. One skilled in the art may design and implement new algorithms, too.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
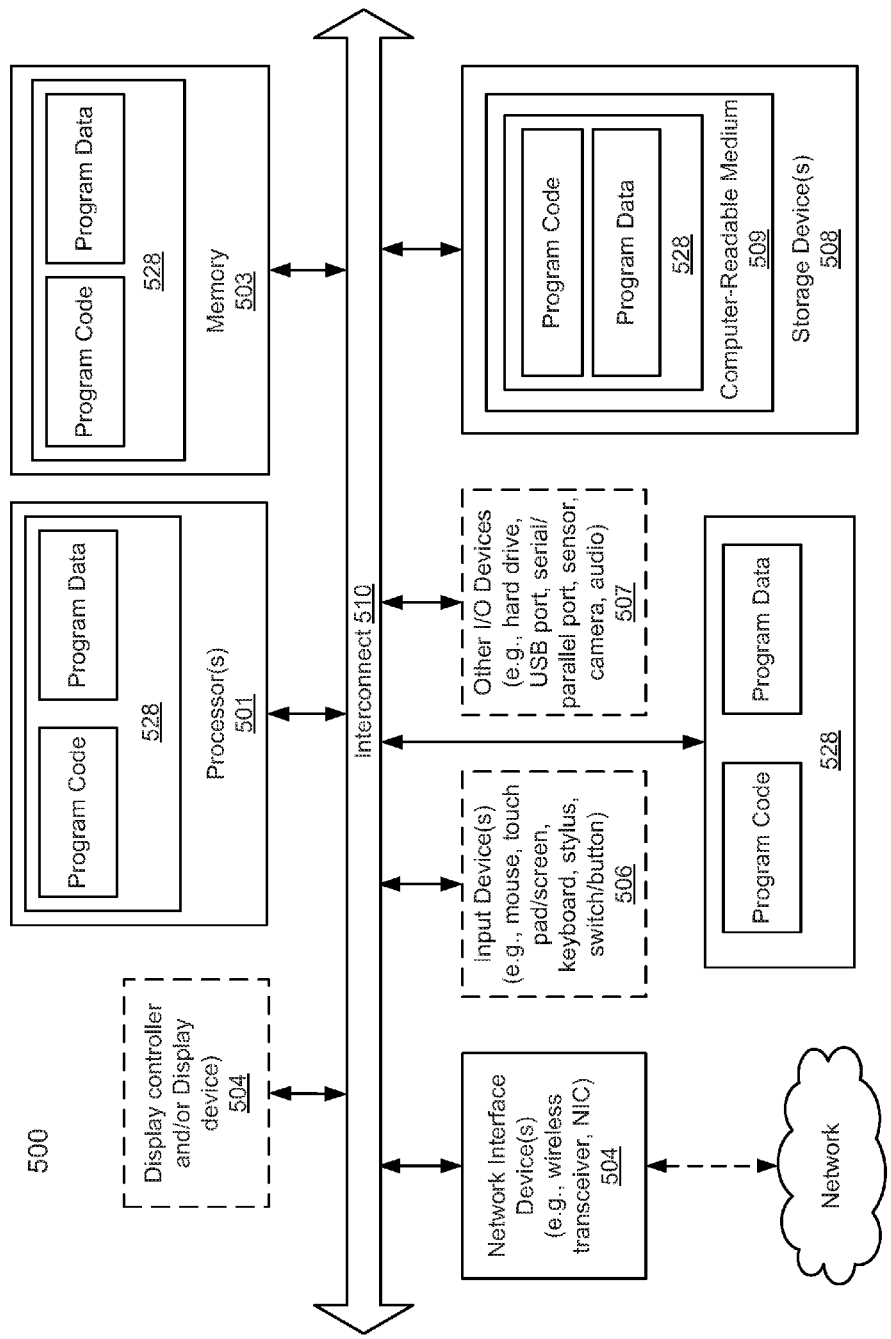
FIG. 5 is a block diagram illustrating a data processing system according to another embodiment of the invention.

FIG. 5 is a block diagram illustrating an example of a data processing system which may be used with one embodiment of the invention. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations and steps discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices 505-508, including network interface device(s) 505, optional input device(s) 506, and other optional IO device(s) 507. Network interface device 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with display device 504), a pointer device such as a stylus, and/or a keyboard (e.g., physical keyboard or a virtual keyboard displayed as part of a touch sensitive screen). For example, input device 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-accessible storage medium 509 (also known as a machine-readable storage medium or a computer-readable medium) on which is stored one or more sets of instructions or software (e.g., module, unit, and/or logic 528) embodying any one or more of the methodologies or functions described herein. Module/unit/logic 528 may also reside, completely or at least partially, within memory 503 and/or within processor 501 during execution thereof by data processing system 500, memory 503 and processor 501 also constituting machine-accessible storage media. Module/unit/logic 528 may further be transmitted or received over a network via network interface device 505.

Computer-readable storage medium 509 may also be used to store the some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 528, components and other features described herein can be implemented as discrete hardware components or integrated in the functionality of hardware components such as ASICS, FPGAs, DSPs or similar devices. In addition, module/unit/logic 528 can be implemented as firmware or functional circuitry within hardware devices. Further, module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A disk drive, comprising:
a rotatable platter for storing data magnetically,
a central spindle to rotate the rotatable platter around an axis,
an electric motor to drive the central spindle, and
a plurality of read-write heads mounted over the rotatable platter, the plurality of read-write heads operable to read the data stored on the rotatable platter and to write data to the rotatable platter;

wherein each of the read-write heads has a dedicated buffer to store data to be written or read by the read-write head.

2. The disk drive of claim 1, wherein the rotatable platter comprises a plurality of tracks, each of the plurality of read-write heads to perform read and write operations on one of the plurality of tracks.

3. The disk drive of claim 1, wherein the plurality of read-write heads are operable to perform read-write operation substantially simultaneously.

4. The disk drive of claim 1, wherein the plurality of read-write heads comprise read heads for reading data only and write heads for writing data only.

5. The disk drive of claim 1, further comprising one or more rotatable platters, each of which rotatable around the axis by the central spindle.

6. The disk drive of claim 1, further comprising a multiplexer for selecting one of the plurality of read-write heads at a time.

7. The disk drive of claim 1, further comprising:
a buffer to store data to be written or read by the read-write heads, and
a controller having an output channel to output the data from the buffer and to receive data from outside of the disk drive.

8. The disk drive of claim 7, wherein the controller comprises a plurality of output channels to output and receive data substantially simultaneously.

9. The disk drive of claim 7, wherein the controller supports parallel data reception and transmission between the buffer and a disk driver.

10. The disk drive of claim 1, wherein the read-write heads are non-movable.

11. A data processing system, comprising:
a processor;
a memory storing executable instructions that are executable by the processor; and
a disk drive to store data, the disk drive comprising:
a rotatable platter for storing data magnetically,
a central spindle to rotate the rotatable platter around an axis,
an electric motor to drive the central spindle, and
a plurality of read-write heads mounted over the rotatable platter, the plurality of read-write heads operable to read the data stored on the rotatable platter and to write data to the rotatable platter;
wherein each of the read-write heads has a dedicated buffer to store data to be written or read by the read-write head.

12. The data processing system of claim 11, wherein the rotatable platter comprises a plurality of tracks, each of the plurality of read-write heads to perform read and write operations on one of the plurality of tracks.

13. The data processing system of claim 11, wherein the plurality of read-write heads are operable to perform read-write operation substantially simultaneously.

14. The data processing system of claim 11, wherein the plurality of read-write heads comprise read heads for reading data only and write heads for writing data only.

15. The data processing system of claim 11, wherein the disk drive further comprises one or more rotatable platters, each of which rotatable around the axis by the central spindle.

16. The data processing system of claim 11, wherein the disk drive further comprises a multiplexer for selecting one of the plurality of read-write heads at a time.

17. The data processing system of claim 11, wherein the disk drive further comprises:
a buffer to store data to be written or read by the read-write heads, and
a controller having an output channel to output the data from the buffer and to receive data from outside of the disk drive.

18. The data processing system of claim 17, wherein the controller comprises a plurality of output channels to output and receive data substantially simultaneously.

19. The data processing system of claim 17, wherein the controller supports parallel data reception and transmission between the buffer and a disk driver.

20. The data processing system of claim 11, wherein the read-write heads are non-movable.

* * * * *